Patented Aug. 4, 1953

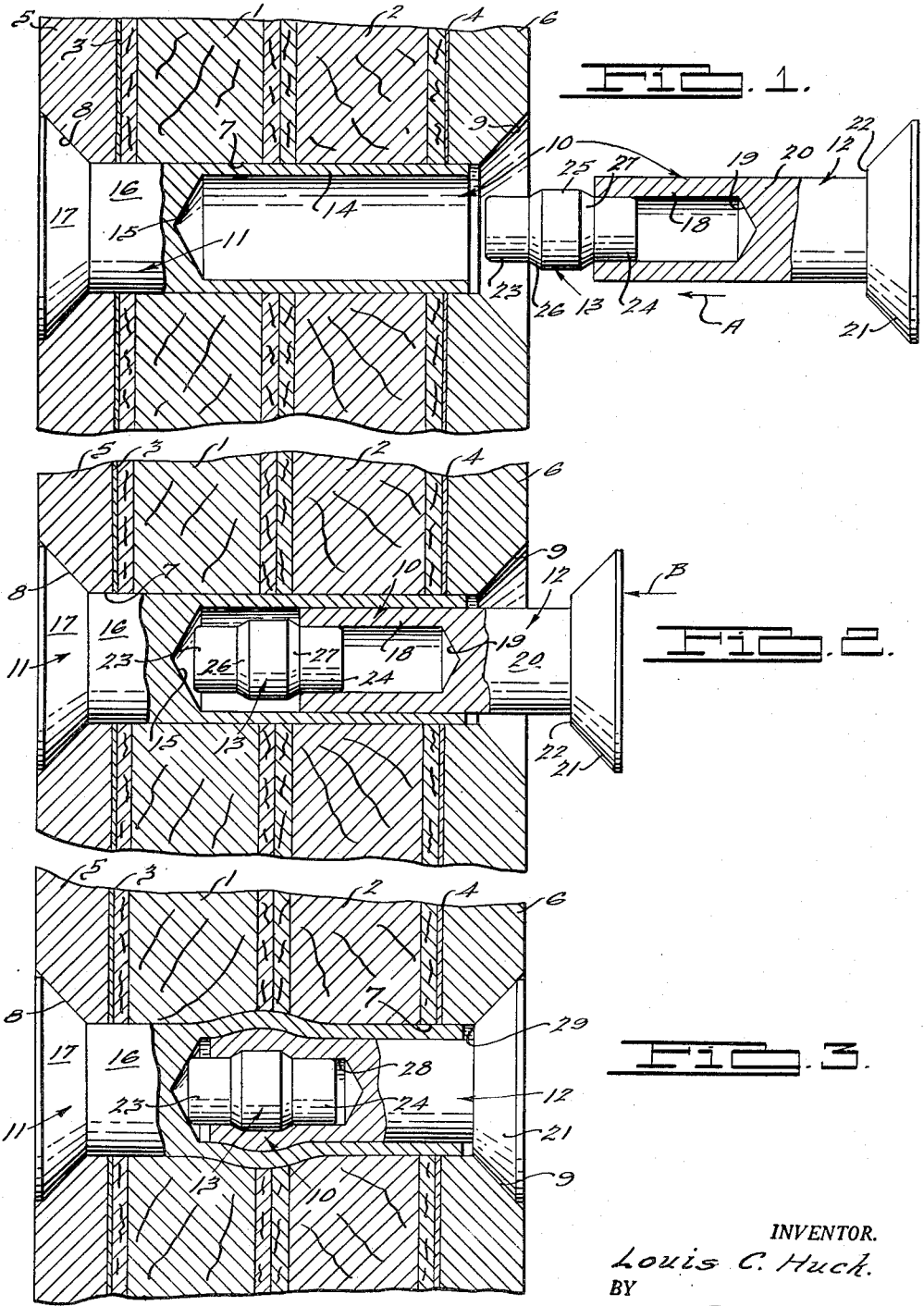

2,647,432

UNITED STATES PATENT OFFICE 2,647,432

DIVIDED HOLLOW RIVET WITH EXPANDING MEANS

Louis C. Huck, Detroit, Mich., assignor to Huck Manufacturing Company, Detroit, Mich., a corporation of Michigan Application September 8, 1948, Serial No. 48,242

2 Claims. (Cl. 85—40)

The present invention relates to improvements in fasteners, and particularly to fasteners having flush heads for securing panel members, or the like, together.

One of the primary objects of the present invention is to provide an improved fastener having a plurality of interfitting members in which the members are locked together and are firmly secured to the panels or the other members with which the fastener is used.

A further object of the invention is to provide an improved fastener which securely holds a pair of panels together and which will maintain such firm hold in use when subjected to continuous vibration.

A further object of the invention is to provide an improved fastener which may be used to hold panels together in which there may be variation in the thickness of the panels and, consequently, variation in the length of the bore through which the fastener passes.

Another object of the invention is to provide a simplified fastener which is economical to manufacture, and which may be readily applied.

Other objects of the invention will become apparent from the following specification, the drawing relating thereto, and from the claims hereinafter set forth.

In the drawing in which like numerals are used to designate like parts in the several views throughout:

Figure 1 is a cross-sectional view of a plurality of panels to be fastened together by the fastener of the present invention, such fastener being shown partially in elevation and partially in cross-section, and with the elements of the panel separated prior to assembly.

Fig. 2 is a view similar to Fig. 1, but showing the fastener elements in an intermediate stage of assembly;

Fig. 3 is a view similar to Fig. 1 and showing the fastener element in its final locked position.

The fastener of the present invention is particularly adapted for securing a plurality of wooden panels together; but it will be appreciated that it is not limited to such use, and will be equally useful in other applications.

Referring to the drawing, a pair of panels 1 and 2 are shown, such panels being plywood panels in the embodiment illustrated, and having thin metal sheets 3 and 4 secured on the exterior surfaces thereof. In the embodiment illustrated such sheets 3 and 4 are aluminum, but may be other metals. Metal strips or plates 5 and 6 are disposed on the outside surfaces of the composite panels 1 and 2. The composite panels 1 and 2, and the strips 5 and 6, have aligned openings therethrough providing a bore 7. The opening in the strips 5 and 6 terminate adjacent their outer faces in countersinks 8 and 9.

A fastener, generally indicated at 10, is adapted to be received within the bore 7, and when in its final assembled position, as shown in Fig. 3, to securely hold composite panels 1 and 2 and the strips 5 and 6 together.

The fastener 10 comprises three parts; a female part 11, a male part 12, and a lock pin 13.

The female part 11 is circular in cross-section and has a tubular portion 14 having one end open, and terminating in a conical base 15 adjacent a solid portion 16 of the rivet which joins with the rivet head 17. The head 17 is preferably flat, so that it will be flush with the surface of the strip 5, and is tapered complementary to the taper of the countersink 8. The exterior diameter of the tubular portion of the female member 11 is such as to provide a close fit with the bore 7. The length of the female member 11 is the same, or slightly less than, the length of the bore 7.

The male member 12 is circular in cross-section and has a tubular inner end 18 terminating in a tapered base 19 adjacent the solid portion 20. The solid portion 20 joins with a solid head 21, the exterior surface of which is flat so that it will be flush with the surface of the strip 6, and having a tapered form complementary to the countersink 9. The tubular and solid parts of the rivet are of such diameter as to be telescopically received within the bore of tubular portion 14 of the female member and joins the head at the annular shoulder 22.

The lock pin 13 has symmetrical, cylindrical end portions 23 and 24 and an intermediate enlarged cylindrical portion 25 which is joined to the end portions 23 and 24 by tapered portions 26 and 27, respectively. The symmetrical ends allow reversability in positioning the lock pin in the male member.

The cylindrical end 24 is telescopically received within the adjacent tubular end of the male member 12, and a tight fit is preferably provided so that the male member 12 and the lock pin 13 are held together as a sub-assembly for the final assembly.

As shown in Fig. 1, the female member 11 is positioned within the bore 7 and with the head 17 flush with respect to the strip or plate 5. The lock pin 13 is assembled with the male member, as shown, and movement of this subassembly in the direction of arrow A will position the male member 12 within the female member 11 in the position shown in Fig. 2, so that in such position the male and female members are assembled and ready for driving. In this position, the end 23 of the lock pin 13 has abutted against the base 15.

Further driving of the male member 11 in the direction of the arrow B causes relative movement of the male member 12 into the female member 11 to the final assembled and locked position shown in Fig. 3. In moving to such final position, the lock pin 13 is forced into the bore of the male member 12 so that the edge of the tubular portion 18 is forced over the taper 12, the cylindrical portion 25, and down around the taper 26 over a portion of the end 23. At the same time, the embracing portion of the female member 11 is similarly distorted or bulged out so that the final form substantially assumes that shown in Fig. 3. It will be appreciated that the wooden panels are compressible, so that those portions of the panel adjacent the bulged out portions of the male and female members will be compressed to permit this distortion.

The effect is to provide bulbed-out, interfitting portions on the central regions only of the male and female members, on both sides of the central enlarged portion 25 of the lock pin, and a positive lock against relative axial movement of the male and female members is thus provided.

The heads 17 and 21 are substantially flush with the adjacent surfaces of the strips or plates 5 and 6. It is pointed out that the bore of the tubular portion 18 is of such a length, and the length of the female member 11 is such, that spaces 28 and 29 remain in the final assembly. The extent of such spaces, and within the limits of such spaces, will permit firm securing of panel members where there may be variations in thickness thereof.

While only one specific embodiment of the present invention has been illustrated, changes may be made in the embodiment described without departing from the spirit and substance thereof, the scope of which is commensurate with the appended claims.

What is claimed is:

1. A fastener comprising a female member including a head and a shank having a cylindrical recess extending axially inwardly of the end thereof remote from said head, a male member including a head and a cylindrical shank slidably fitting said cylindrical recess and having a cylindrical recess extending inwardly of the end thereof remote from the head of said male member, and a locking element having cylindrical end portions adapted to slidably fit said recess in said male member and an intermediate enlarged portion, the depth of said cylindrical recess in said male member being greater than the combined lengths of one of said end portions and said intermediate portion, the depth of said cylindrical recess in said female member being greater than the combined lengths of the other of said end portions and said intermediate portion, and the length of said shank of said male member being greater than the depth of said recess in said female member less the length of the other of said end portions of said locking element, so that, upon telescopic movement of said male member into said female member with said locking element mounted on said male member with said one of said end portions received in said recess in said male member, said locking element will engage said female member at the inner end of said recess and the portion of the shank of said male member adjacent said other end thereof will be forced over said enlarged intermediate portion of said locking element and received over a part of said other end portion of said locking element.

2. A fastener comprising telescoping male and female members each including a shank, a head at one end of each said shank, and a recess extending inwardly of the other end of the shank, said recess of said female member being of similar cross section to and adapted to slidably receive said shank of said male member, and a locking element having end portions similar in cross section to and adapted to be slidably received in said recess in said male member, said locking element having an intermediate portion of substantially larger cross section than said recess in said male member, said locking element being adapted to be mounted in said male member with one of said end portions received in the recess thereof, said recess in each of said members being of a depth greater than the combined lengths of the one of said end portions extending toward the head of said member and said intermediate portion of said locking element respectively, and said shank of said male element being of a length greater than the depth of said recess in said female member less the length of the other of said end portions of said locking element.

LOUIS C. HUCK.

References Cited in the file of this patent

UNITED STATES PATENTS

| Number | Name | Date |
|---|---|---|
| 775,728 | Miller | Nov. 22, 1904 |
| 1,824,028 | Miller | Sept. 22, 1931 |
| 2,129,167 | Cunnington | Sept. 6, 1938 |
| 2,154,012 | Rhodes | Apr. 11, 1939 |
| 2,236,926 | Surface | Apr. 1, 1941 |
| 2,492,096 | Juengst | Dec. 20, 1949 |

FOREIGN PATENTS

| Number | Country | Date |
|---|---|---|
| 290,991 | Great Britain | Aug. 25, 1927 |